UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

VARNISH.

1,018,385.  Specification of Letters Patent.  Patented Feb. 20, 1912.

No Drawing.  Application filed March 14, 1911. Serial No. 614,431.

*To all whom it may concern:*

Be it known that I, LEO H. BAEKELAND, a citizen of the United States, residing at Yonkers, in the county of Westchester and State of New York, have invented certain new and useful Improvements in Varnish, of which the following is a specification.

This invention relates to the preparation of solutions such as lacquers or varnishes suitable for application by dipping, brushing, spraying, or other usual methods, and containing as essential components a condensation product of phenolic bodies and formaldehyde, and a solvent liquid. The condensation products used are such as are capable of transformation by heat into infusible bodies.

It is now well understood in the art that phenolic bodies and formaldehyde are capable of yielding, according to the conditions of reaction, a series of differing condensation products, whereof certain ones are soluble in alcohol, acetone, phenol and some other liquids but may be transformed by continued heating into insoluble bodies. It has been proposed heretofore to prepare varnishes from such initial or partial condensation products by dissolving them in alcohol or acetone, or by dissolving an initial condensation product containing a large excess of phenol in benzol. I have found that varnishes so prepared present the disadvantage of persistently retaining a certain proportion of water, which very materially lessens their value for certain uses, particularly such as pertain to electrical insulation. Furthermore, alcohols absorb moisture from the atmosphere, and tend therefore, particularly in damp weather, to yield white films and inferior coatings. Free phenol and cresol also retain water very persistently, even at comparatively high temperatures, and constitute therefore when present in any considerable proportions a disturbing element, particularly when the solution is to be applied as an electrical insulator. For example, an ordinary alcoholic solution of an initial condensation product of phenols and formaldehyde contains a certain proportion of water, derived both from the condensation product and from the commercial alcohol (as wood alcohol for instance) employed as the solvent. If the solution contains also free phenol or cresol, it is found that upon drying the alcohol is very largely eliminated, together with a part of the water. By subsequent gentle heating the alcohol may be practically all eliminated, but a small proportion of water is tenaciously held by the phenol or cresol. In order completely to eliminate this water it is found necessary to continue the heating until the free phenol or cresol is driven off. As long as the phenolic body remains it will retain some water, in much the same manner as does sulfuric acid. While uncombined cresol and phenol are in this respect objectionable constituents of varnishes intended for electrical insulating purposes, they may exert in other ways a favorable action, imparting to the mass a certain degree of plasticity or flexibility, and also increasing the solubility of the initial products. I have found that a varnish or solution which avoids the foregoing objections while possessing the above-mentioned advantages and having a very high dielectric strength may advantageously be prepared as follows:

An initial condensation product of phenols and formaldehyde, prepared for example as described in my prior U. S. Patent No. 954,666, patented April 12, 1910, using a base as a condensing agent, or by any other suitable or preferred method, is washed or otherwise freed from uncombined phenol, cresol and other foreign matters. The product is then freed from water and dissolved in any appropriate solvent, as for example acetone or a mixture of acetone and alcohol. To this solvent either before or after the condensation product is dissolved therein, is added in suitable proportion a material having a higher boiling point than water but having little or no affinity for water and therefore practically immiscible therewith, said material being also volatile without decomposition when heated at atmospheric pressures. Typical bodies of this character are amyl alcohol, toluene and xylene. The proportions of the ingredients may be widely varied according to the practical requirements, a varnish suitable for many purposes comprising for example 100 parts by weight of initial condensation product of phenols and formaldehyde, substantially free from uncombined phenol or cresol, dissolved in 75 parts of wood alcohol to which has been added 40 parts of acetone and 5 parts of commercial amyl alcohol. This varnish may be further thinned as may be required for any particular use or mode of application, as is well understood in the art. When a varnish of this character is permitted to dry the methyl alcohol and water are eliminated with substantial completeness at ordinary temperatures or with slight heating. The amyl alcohol however, by reason of its higher boiling point, may be retained to an extent sufficient to impart the desirable plasticity to the mass.

Amyl alcohol, in contradistinction to such bodies as glycerin, phenol, cresol, etc., has little affinity for water, and this renders it most valuable as an addition to varnishes for electrical insulating purposes. It may be replaced by other bodies possessing the same essential characteristics, viz., a higher boiling point than water and a lack of affinity therefor, as evidenced by its immiscibility, the capability of volatilizing without decomposition when boiled at atmospheric pressures, together with the property, alone or in conjunction with other solvents, of yielding solutions of the condensation product. The solvent to be used with the amyl alcohol should be readily volatile, that is to say, it should have a boiling point not exceeding that of water, and preferably somewhat lower than this, examples of such solvents being wood alcohol, ethyl alcohol, acetone, and mixtures of these.

Varnishes prepared as above may be compounded with certain materials soluble therein or miscible therewith, as for example resins, oils, including Chinese oil or tung oil, oleo resins and oleo-resinous varnishes, rubber, gutta percha, asphalt, nitrocellulose and like materials, which may impart increased elasticity or other desirable properties to the film. Or the same result may be secured by increasing the proportion of amyl alcohol or its equivalents.

In the above specification, as well as in the following claims, the word "phenols" is used to designate not only the first member of the phenolic group but its homologues, or phenolic bodies or mixtures thereof, which are equivalent in this reaction; in the same way, the polymers of formaldehyde, or other substances which may engender formaldehyde, may be used as an equivalent of formaldehyde.

The term "varnish" as herein used is to be considered as including broadly all solutions of the character described, whether employed as clear varnishes or lacquers, or as vehicles for pigments, inert fillers, etc.

I claim:

1. As a new composition of matter, a varnish comprising a condensation product of phenols and formaldehyde substantially free from uncombined phenols and a solvent therefor, said solvent containing a readily volatile organic liquid, and another organic liquid which is immiscible with water but miscible with said solvent and of which the boiling point exceeds that of water.

2. As a new composition of matter, a varnish comprising a condensation product of phenols and formaldehyde and a solvent therefor, said solvent containing amyl alcohol and a readily volatile organic liquid.

3. As a new composition of matter, a varnish comprising a condensation product of phenols and formaldehyde substantially free from uncombined phenols and a solvent therefor, said solvent containing acetone and an organic liquid of which the boiling point exceeds that of water.

4. As a new composition of matter, a varnish comprising a condensation product of phenols and formaldehyde and a solvent therefor, said solevent containing acetone and amyl alcohol.

5. As a new composition of matter, a varnish comprising a condensation product of phenols and formaldehyde and a solvent therefor, said solvent containing a readily volatile organic liquid, and another organic liquid which is immiscible with water but miscible with said solvent, which is volatilizable without decomposition when heated at atmospheric pressures, and of which the boiling point exceeds that of water.

6. As a new composition of matter, a varnish comprising a condensation product of phenols and formaldehyde and a solvent therefor, said solvent containing acetone and an organic liquid which is volatilizable without decomposition when heated at atmospheric pressures, and of which the boiling point exceeds that of water.

In testimony whereof, I affix my signature in presence of two witnesses.

LEO H. BAEKELAND.

Witnesses:
HERBERT S. MAY,
WM. S. GORDON, Jr.